United States Patent [19]
Sato

[11] Patent Number: 6,109,502
[45] Date of Patent: Aug. 29, 2000

[54] ULTRASONIC VIBRATION BONDING RESONATOR

[75] Inventor: Shigeru Sato, Fukuoka-ken, Japan

[73] Assignee: Ultex Corporation, Fukuoka, Japan

[21] Appl. No.: 09/301,480

[22] Filed: Apr. 28, 1999

[30] Foreign Application Priority Data

Apr. 28, 1998 [JP] Japan .................................. 10-119466

[51] Int. Cl.[7] .................................................. B23K 20/10
[52] U.S. Cl. ........................ 228/1.1; 228/55; 310/323.18; 310/328
[58] Field of Search .................................. 228/110.1, 111, 228/111.5, 1.1, 55; 310/323.01, 323.18, 328

[56] References Cited

U.S. PATENT DOCUMENTS

| | | |
|---|---|---|
| 3,780,926 | 12/1973 | Davis ........................................ 228/1.1 |
| 4,808,948 | 2/1989 | Patel et al. . |
| 5,057,182 | 10/1991 | Wuchinich ............................ 156/580.1 |
| 5,244,140 | 9/1993 | Ramsey et al. ....................... 228/110.1 |
| 5,377,894 | 1/1995 | Mizoguchi et al. ..................... 228/1.1 |
| 5,385,288 | 1/1995 | Kyomasu et al. ....................... 228/1.1 |
| 5,411,195 | 5/1995 | Yamazaki et al. ...................... 228/1.1 |
| 5,486,733 | 1/1996 | Yamazaki et al. ...................... 310/323 |
| 5,540,807 | 7/1996 | Akiike et al. ........................ 156/580.1 |
| 5,931,367 | 8/1999 | Sato et al. ................................. 228/1.1 |

Primary Examiner—Samuel M. Heinrich
Attorney, Agent, or Firm—Kanesaka & Takeuchi

[57] ABSTRACT

In order to realize effective and economical bonding operation even on workpiece whose inside is quite deep, a bonding tool, which has a length equivalent to a whole number of multiples of half the wavelength of the resonance frequency, is secured to an ultrasonic horn by a screw member which can advance or retreat in a direction perpendicular to the vibration direction indicated by an arrow X, thereby causing a front end surface of the bonding tool vibrate in the same direction as the vibration of the ultrasonic horn.

1 Claim, 3 Drawing Sheets

ULTRASONIC VIBRATION BONDING RESONATOR

BACKGROUND OF THE INVENTION

1. Field of the Invention

The present invention relates to a resonator used in a bonding apparatus for overlapped bonded members by ultrasonic vibration

2. Description of the Prior Art

As disclosed in Japanese Published Patent Application No. Sho 54–13349, it is known that an ultrasonic vibration bonding apparatus is provided with a resonator connected to an oscillator for generating ultrasonic vibration and a mount for mounting overlapped bonded members thereon and holding these members under pressure between this mount and the resonator, wherein an interface of the overlapped bonded members is bonded by transmitting the ultrasonic vibration from the oscillator to the resonator.

The resonator used in such an ultrasonic vibration bonding apparatus is made through the following process. Materials for the resonator are cut to a shape and size determined by the materials, thickness and shape of the bonded members, oscillation output of the oscillator and the like to make a primarily processed product. The primarily processed product is then connected to the oscillator for actual vibration, and the length and thickness is regulated to have a desired resonance state. A secondary processing including tuning of the resonance state is thus added to the primarily product before official use. However, the bonding function area of the resonator is worn down by diffusion caused by bonding temperature. If the surface profile of the bonding function area of the resonator becomes rough by such repeated wear, a bonding failure of the bonded members may occur or a bonding flaw may be produced on the surface of the bonded members, thereby leading to lack of quality and reliability. To improve the situation, the surface of the bonding function area of the resonator must be polished for repair. However, the resonator must be removed from the apparatus for repair, and reassembling and re-tuning of the resonator require a great deal of labor and time. In addition, a polishing margin of the bonding function area can not be secured sufficiently to obtain an appropriate resonance state. The resonator therefore can not be used any longer after several repairs and quite uneconomical for the user. Also, since the bonding function area is too short to carry out an effective bonding operation on the inside of a workpiece having a box-like shape because the workpiece is quite deep.

SUMMARY OF THE INVENTION

It is therefore an object of the present invention to provide a resonator for use in an ultrasonic vibration bonding apparatus which can perform effective and economical bonding operation even on workpiece whose inside is quite deep.

According to claim 1 of the present invention, there is provided a resonator for use in an apparatus for bonding overlapped bonded members utilizing ultrasonic vibration, comprising an ultrasonic horn having a length equivalent to a whole number of multiples of half the wavelength of the resonance frequency from an oscillator for generating ultrasonic vibration, and a bonding tool having a length equivalent to a whole number of multiples of half the wavelength of the resonance frequency, wherein the bonding tool is fixedly secured to the ultrasonic horn by a screw member which can advance or retreat in a direction perpendicular to the vibration direction of the ultrasonic horn so that the bonding tool can be situated at the maximum vibration amplitude point of the ultrasonic horn in a manner extending to one direction perpendicular to the vibration direction of the ultrasonic horn.

The above and other objects, features and advantages of the invention will become more apparent from the following description when taken in conjunction with the accompanying drawings.

BRIEF DESCRIPTION OF THE ACCOMPANYING DRAWINGS

FIG. 2 shows a resonator according to the first embodiment of the present invention, wherein

DETAILED DESCRIPTION OF THE PREFERRED EMBODIMENTS

FIRST EMBODIMENT

Figure 1:
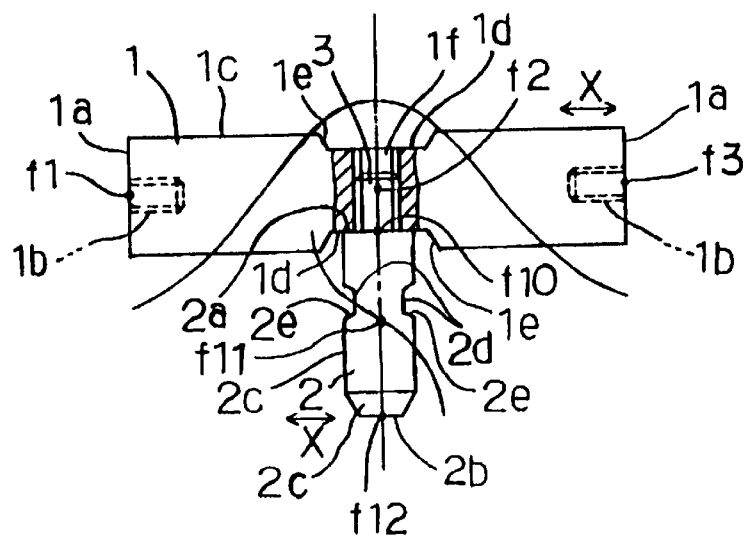
FIG. 1 is a side view showing a first embodiment of the present invention.
Figure 2A:
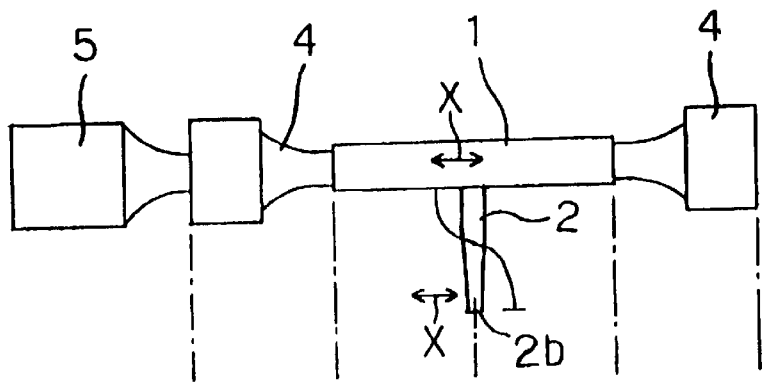
FIG. 2(a) is a side view of the resonator and FIG. 2(b) shows a vibration wave chart.
Figure 2B:
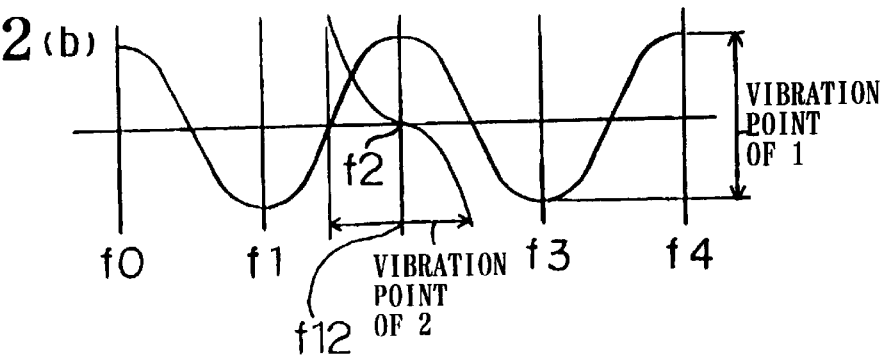
Figure 3:
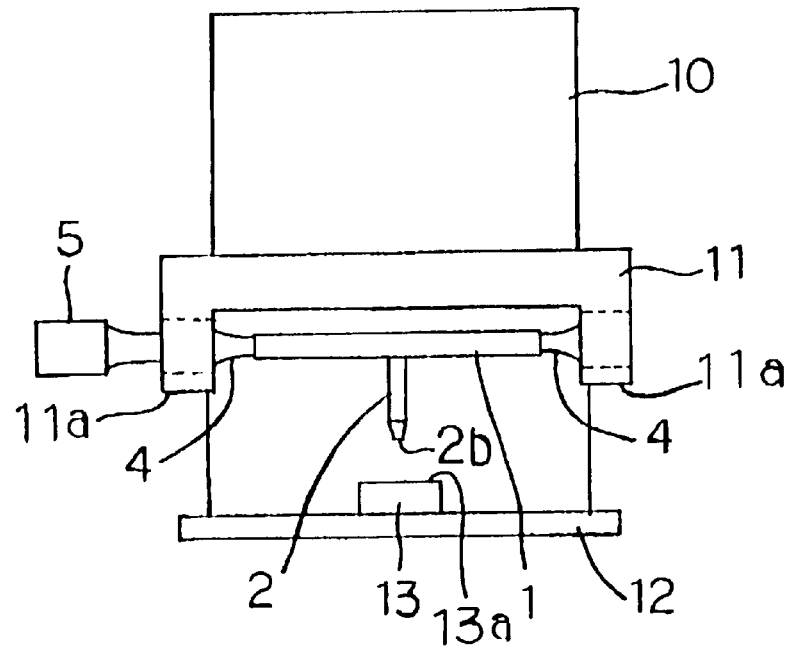
FIG. 3 is a front view showing an ultrasonic vibration bonding apparatus according to the first embodiment of the present invention.

FIGS. 1–3 show a first embodiment of the present invention. FIG. 1 is a side view wherein an ultrasonic horn 1 and a bonding tool 2 are connected together by a screw member 3. FIG. 2(a) is a side view wherein a booster 4 and an oscillator 5 are added to the elements of FIG. 1 and FIG. 2(b) shows a vibration wave corresponding to FIG. 2(a). FIG. 3 is a front view showing an ultrasonic bonding apparatus wherein the elements shown in FIG. 2 are added.

In FIG. 1, the ultrasonic horn 1 forming the resonator body is made of one material selected from aluminum, iron, titanium and the like, in a bar shape, and The oscillator is coaxially connected to one end of the ultrasonic horn directly or indirectly through the booster (not shown). This oscillator is an electro-acoustic transducer or electric oscillation transducer consisting of a piezoelectric element, magnetostrictor or the like for transducing electric energy to mechanical energy. The electric energy is output by generating ultrasonic vibration of longitudinal wave with a predetermined frequency by electric power supplied from an ultrasonic generator (not shown). The ultrasonic horn has a length equivalent to a whole number of multiples of half the wavelength of the resonance frequency which resonates with the ultrasonic vibration transmitted from the oscillator through the booster, or with the ultrasonic vibration transmitted directly from the oscillator. The bonding tool 2 is made of one material selected from aluminum, iron, titanium, and the like as a separate part from the ultrasonic horn 1 and it has a length equivalent to a whole number of multiples of half the wavelength. The bonding tool 2 is fixedly secured to the ultrasonic horn 1 by a screw member 3 which can advance or retreat in a direction perpendicular to a vibration direction indicated by an arrow X of the ultrasonic horn 1. If the ultrasonic horn 1 has a length equivalent to an odd number of multiples of half the wavelength such as ½ wavelength or 3/2 wavelength, the bonding tool 2 is secured to a position of an end of the ultrasonic horn 1 opposite the oscillator corresponding to a maximum vibration amplitude point or to a position of the other maximum vibration amplitude point. If the ultrasonic horn 1 has a length equivalent to an even number of multiples of half the wavelength such as 1 wavelength or 2 wavelengths, the bonding tool 2 is secured to a position of the central maximum vibration amplitude point. The bonding tool 2 may be made of the same material as or a material different from, the ultrasonic horn 1, but it should be determined taking the material of the workpiece as the bonded members into consideration.

In this embodiment, threaded hole 1b for installing the booster or the oscillator is formed, coaxially with the center line of the ultrasonic horn 1, at two ends 1a of the ultrasonic horn 1 where maximum vibration amplitude points f1 and f3 are located. A recess 1e is formed, on the outer surface 1c of the ultrasonic horn 1, at a position where the central maximum vibration amplitude point f2 of the ultrasonic horn 1 is located. The recess 1e is provided with flat bottom surface 1d placed in parallel to face each other with reference to the center line of the ultrasonic horn 1. A threaded hole 1f is formed to penetrate the ultrasonic horn 1 and is provided with a female screw at the bottom surface 1d. The bottom surface 1d has a larger area than a base end surface 2a of the bonding tool 2. The ultrasonic horn 1 is provided on its outer surface with a tool hole (not shown) that is used for connecting the ultrasonic horn to the booster or the oscillator. The bonding tool 2 has maximum vibration amplitude points f10 and f12 on the base end surface 2a and a top end surface 2b opposite the base end surface 2a and is also provided with a screw member 3 which has a male screw axially projecting outward from the base end surface 2a. The screw member 3 is fitted into the threaded hole 1d of the ultrasonic horn 1 to allow the base end surface 2a on the periphery of the screw member 3 to contact the bottom surface 1d of the ultrasonic horn 1. The bonding tool 2 is secured to the ultrasonic horn 1 in a manner extending in one direction perpendicular to a vibration direction indicated by an arrow X. The bonding tool 2 is provided on an outer surface 2c with a pair of tool engaging portions 2e each having flat bottom surface 2d in parallel with reference to its center line.

In FIG. 2, the bonding tool 2 is secured to the ultrasonic horn 1 and the boosters 4 are coaxially connected at each end of the ultrasonic horn 1 by a headless screw (not shown) to form the resonator. In the state where the output end of the oscillator 5 was coaxially connected to one of the boosters 4 by a headless screw (not shown), the resonator resonates, by driving the oscillator 5, with the ultrasonic vibration transmitted from the oscillator 5 and vibrates in the direction indicated by an arrow X to show the vibration wave of five maximum vibration amplitude points f0, f1, f2, f3 and f4 in the elements consisting of the ultrasonic horn 1 and the booster 4. The vibration wave at the bonding tool 2 has a length of half the wavelength transduced to allow the minimum vibration amplitude point (nodal point) to exist in the maximum vibration amplitude point f2, and the top end surface 2b having the maximum vibration amplitude point f12 vibrates in the direction indicated by an arrow X, that is, the same direction as the vibration of the elements consisting of the ultrasonic horn 1 and the booster 4.

In FIG. 3, an ultrasonic bonding apparatus 10 has a C-shaped holder 11 adapted to be moved up and down by a built-in pressing mechanism of the ultrasonic apparatus 10. The holder 11 is provided on both ends with holding portions facing each other to which each booster 4 of the resonator is fitted. With this arrangement, the resonator is firmly supported by these two holding portions. The top end surface 2b of the bonding tool 2 is spaced apart, at predetermined intervals, from an upper surface 13a of a mount 13 mounted on a lower base 12 of the ultrasonic bonding apparatus 10 in parallel. In the state where overlapped bonded members (not shown) were mounted on the upper surface 13a of the mount 13, the holder 11 is pressed down by the pressing mechanism to actuate the oscillator 5 on its way down. The overlapped bonded members are then sandwiched by the top end surface 2b of the bonding tool 2 and the upper surface 13a of the mount 13, and the ultrasonic vibration from the bonding tool 2 is applied to the bonded members to bond the joint surface between the bonded members.

According to this first embodiment, the screw member 3 projecting from the base end surface 2a of the bonding tool 2 is fitted into the threaded hole if from one side of the threaded hole 1f of the ultrasonic horn 1. A fastening tool 2 such as a wrench (not shown) is applied to the tool engaging portion 2e of the bonding tool 2 to grip it. The bonding tool 2 is now fixedly secured to the ultrasonic horn 1 by tightening the screw member 3 with the fastening tool. In this state, the base end surface 2a of the bonding tool 2 on the periphery of the screw member 3 abuts against the bottom surface 1d of the ultrasonic horn 1 and as a reaction, the male screw of the screw member 3 mates with the female screw of the threaded screw 1f. When the ultrasonic horn 1 is set to resonate with ultrasonic vibration transmitted from the oscillator (not shown) connected thereto, the bonding tool 2 vibrates in the same direction as the vibration of the ultrasonic horn 1 without dancing in the recess 1e, thereby performing proper boding by ultrasonic vibration.

When the bonding tool 2 is replaced, the fastening tool is applied to the tool engaging portion 2e of the bonding tool 2 secured to the ultrasonic horn 1 to loosen the screw member 3 and the bonding tooling 2 is removed from the ultrasonic horn 1. After this, according to the same procedure as stated above, another bonding tool 2 can be fixedly secured to the ultrasonic horn 1 by the screw member 3. Namely, it is possible to reuse the ultrasonic horn 1 whose resonance state has been properly tuned, merely by replacing the bonding tool 2 with another bonding tool 2 without removing the ultrasonic horn 1 from the holder 11 of the ultrasonic bonding apparatus 10. With this arrangement, quality and reliability can be assured and it is also economical.

Further, according to this embodiment, since the bonding tool 2 is installed in a manner extending in one direction perpendicular to the vibration direction of the ultrasonic horn 1, it is possible to carry out an effective bonding operation on workpieces such as the inside of a box that is quite deep, or even when surroundings of the workpiece hinder the bonding operation.

Second Embodiment

Figure 4:
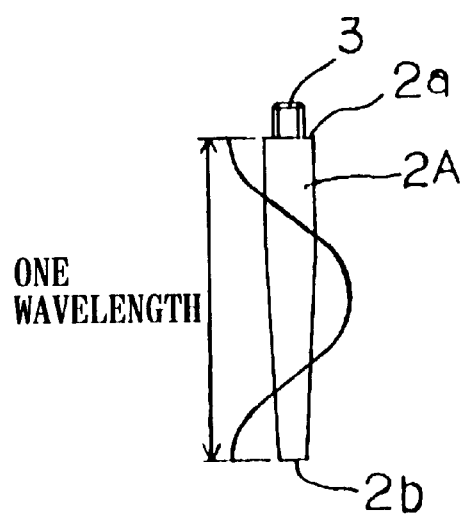
FIG. 4 is a side view showing a second embodiment of the present invention.

FIG. 4 shows a side of a bonding tool 2A according to the second embodiment. The bonding tool 2A has a length equivalent to the wavelength of the resonance frequency. It also has the maximum vibration amplitude point at the base end surface 2a and the top end surface 2b. A screw member 3 is provided with a male screw outside the base end surface 2a in the axial direction and arranged to project from the base end surface 2a. The bonding tool 2A is also designed to be further distant from the ultrasonic horn 1 compared with the bonding tool 2 of the first embodiment. Thus, effective bonding can be performed on various workpieces (bonded members) merely by replacing the bonding tool 2 of the first embodiment with the bonding tool 2A of the second embodiment.

Third Embodiment

Figure 5:
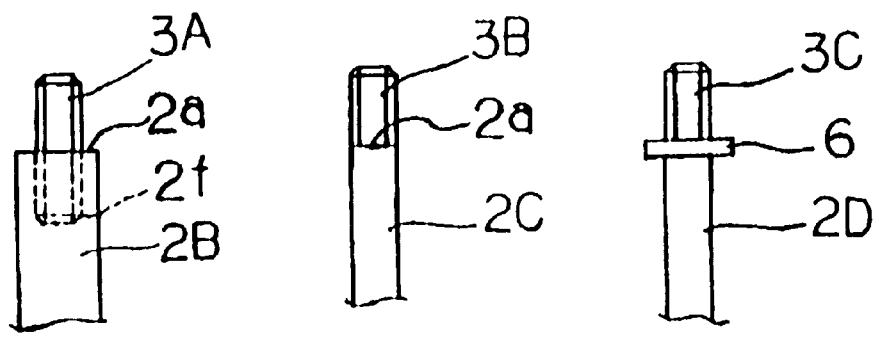
FIG. 5 is a side view showing a third embodiment of the present invention.

FIG. 5 shows the relationship between bonding tools 2B, 2C and 2D and screw members 3A, 3B and 3C according to a third embodiment of the present invention. In FIG. 5(a), the bonding tool 2B has a threaded hole 2f provided with a female screw at a base end surface 2a. The screw member 3A is a headless screw, wherein a half portion of the screw member 3A is threaded into the threaded hole 2f and another half portion thereof coaxially projects from the bonding tool 2B in a straight line. In FIG. 5(b), the bonding tool 2C is provided with a round bar which projects coaxially from the base end surface 2a and integrally formed with the bonding tool 2C. The round bar is also provided with a male screw at the periphery and the bonding tool 2c is provided with the screw member 3B. In FIG. 3(c), a guard 6 is formed between the bonding tool 2D and the screw member 3C. Namely, as far as the relationship between the bonding tools 2B, 2C and 2D and the screw members 3A, 3B and 3C is concerned, any of the stud bolt type in FIG. 5(a), the integral type FIG. 5(b) and the guard type (c) will do.

Fourth Embodiment

Figure 6:
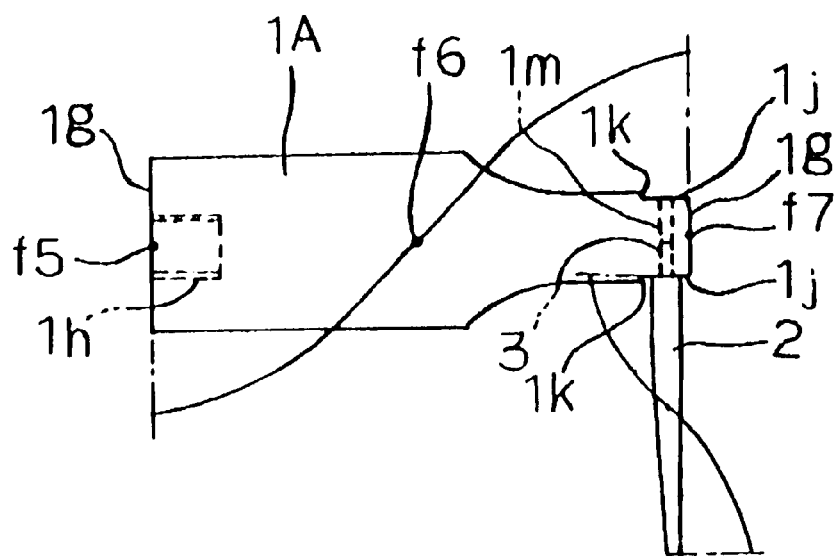
FIG. 6 is a side view showing a fourth embodiment of the present invention.

FIG. 6 is a side view showing an ultrasonic bonding apparatus according to a fourth embodiment of the present invention, in which a bonding tool 2 is secured to an ultrasonic horn 1A held in a cantilevered condition. In FIG. 6, the ultrasonic horn 1A has a length equivalent to an odd number of multiples of half the wavelength of the resonance frequency transmitted from the oscillator such as ½ wavelength or 3/2 wavelength. It is provided with maximum vibration amplitude points f5 and f7 at both ends 1g.

In this fourth embodiment, the ultrasonic horn 1A has a length equivalent to half the wavelength and is provided, coaxially with the center line thereof, with a threaded hole 1h for installing the booster or the oscillator at the end 1g of a side where the maximum vibration amplitude point f5 is located. Also, a side of the ultrasonic horn 1A where the threaded hole 1h is formed is supported, in a cantilevered condition, by a holder of the ultrasonic vibration bonding apparatus. The ultrasonic horn 1A has a gradually reduced half portion on the right side from the minimum vibration amplitude point f6 located in the middle. Formed on the outer surface 1i of this half portion is a recess portion 1k where is provided with flat screw bottom surface 1j in parallel with reference to a center line of the ultrasonic horn 1. The recess portion 1k is formed to correspond to the installation position of the bonding tool 2. The screw bottom surface 1j has a larger area than the base end surface 2a of the bonding tool 2. The bottom surface 1j is provided with a threaded through hole 1m having a female screw. The bonding tool 2 is secured to the ultrasonic horn 1A in a manner extending in one direction perpendicular to the vibration direction indicated by an arrow X by mating the screw member 3 which axially projects outside from the base end surface 2a, with the through hole 1m of the ultrasonic horn 1A.

As described above, according to the present invention, the bonding tool is fixedly secured to the ultrasonic horn by the screw means that can advance or retreat in a direction perpendicular to the vibration direction. With this arrangement, the bonding tool vibrates in the same manner as the vibration direction of the ultrasonic horn, thereby performing proper bonding by ultrasonic vibration. Further, when the bonding tool can not be used any more after repeated repairs by surface polishing, it is possible to reuse the ultrasonic horn whose resonance state has been properly tuned, merely by replacing the old bonding tool with a new one without removing the ultrasonic horn from the apparatus. It is not only economical, but also possible to improve the quality and reliability. Also, since the bonding tool having a length equivalent to a whole number of multiples of half the wavelength of the resonance frequency, is secured in a manner extending in one direction perpendicular to the vibration direction of the ultrasonic horn 1, the bonding tool can function to perform an effective bonding operation even on workpieces such as the inside of a box that is quite deep or even when surroundings of the workpiece hinder the bonding operation.

What is claimed is:

1. A resonator for use in an apparatus for bonding overlapped bonded members by ultrasonic vibration, comprising an ultrasonic horn having a length equivalent to a whole number of multiples of half the wavelength of the resonance frequency from an oscillator for generating ultrasonic vibration; and a bonding tool having a length equivalent to a whole number of multiples of half the wavelength of the resonance frequency, wherein the bonding tool is fixedly secured to the ultrasonic horn by a screw member which can advance or retreat in a direction perpendicular to the vibration direction of the ultrasonic horn so that the bonding tool can be situated at the maximum vibration amplitude point of the ultrasonic horn in a manner extending to one direction perpendicular to the vibration direction of the ultrasonic horn.

* * * * *